United States Patent Office 3,425,989
Patented Feb. 4, 1969

3,425,989
PHENOL CONDENSATION PROCESS COMPRISING REACTING ANHYDROUS PHENOL AND AN ALKALI CATALYST AT A TEMPERATURE OF AT LEAST 130° C., AND THEN SLOWLY ADDING ALDEHYDE
Alvin F. Shepard, Grand Island, N.Y., and Thomas J. McNaughtan, Brentwood, Pa., assignors to Hooker Chemical Corporation, Niagara Falls, N.Y., a corporation of New York
No Drawing. Continuation of application Ser. No. 411,175, Oct. 27, 1964. This application Jan. 17, 1968, Ser. No. 698,662
U.S. Cl. 260—55                                 8 Claims
Int. Cl. C08g 5/00

ABSTRACT OF THE DISCLOSURE

A process which is useful for producing phenol-aldehyde condensates in which the phenol and aldehyde resins are joined to form o,o'-alkylidene linkages, comprises heating a mixture of a phenol in substantially anhydrous condition with an inorganic alkali catalyst to a temperature of at least 130 degrees centigrade and below the boiling point of the phenol, and then introducing an aldehyde slowly into the preheated mixture in total proportion of 0.1 to 1 mole of the aldehyde per 1 mole of the phenol, and retaining the resulting mixture at a temperature within the range stated until all the aldehyde has been introduced.

---

This is a continuation of application Ser. No. 411,175, filed Oct. 27, 1964, now abandoned.

This invention relates to phenol-aldehyde condensation products having a high percentage of o,o'-alkylidene linkages, and to a process for preparing such products.

When a phenol and an aldehyde react, the ortho and para positions of the phenol are active, and the alkylidene radicals from the aldehyde join the phenol residues at the ortho and para positions. Phenol-aldehyde condensates produced by processes known in the art usually have a mixture of o,o'-, o,p'- and p,p'-alkylidene linkages of the phenol and aldehyde residues. Compositions having a high percentage of o,o'-alkylidene linkage have been prepared by indirect processes involving blocking off the para-position to force reaction at the ortho positions, and subsequently removing the para-substituent. But, such processes are not as economically attractive as a process wherein blocking with, and removal of, a para substituent are avoided by having the desired reaction go directly, as in the present invention.

It is an objective of this invention to provide a commercially feasible process which produces phenol-aldehyde condensates having a high percentage of o,o'-alkylidene linkages, that is, condensates in which the position that is para to the hydroxyl group of the phenolic portion of the condensate is predominantly in unreacted condition, i.e., not part of a polymeric chain.

The objects of this invention are accomplished by a process which comprises heating a mixture of a phenol in substantially anhydrous condition with an inorganic alkali catalyst of condensation of phenol with an aldehyde and in communication with the atmosphere to a temperature of at least 130° C. and below the boiling point of the phenol, then introducing an aqueous solution of an aldehyde, preferably formaldehyde, slowly into the preheated mixture in total proportion of 0.1 to one mole of the aldehyde for one mole of the phenol, preferably 0.5 to 0.9 mole of the aldehyde for one mole of the phenol, and maintaining the resulting mixture at all times during the introduction of the aldehyde at a temperature within the range stated and until all the aldehyde has been introduced.

Suitable phenols for use in the process include phenol itself having the formula $C_6H_5OH$, cresol, resorcinol, phloroglucinol, methyl ethyl phenol, meta-ethyl phenol, symmetrical xylenol, meta-isopropyl phenol, and similar para unsubstituted phenols which in general have the following formula:

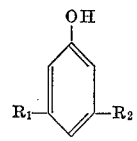

wherein $R_1$ and $R_2$ are independently selected from the group consisting of hydrogen and lower alkyl. The alkyl groups generally have 1 to 4 carbon atoms. The phenols are generally para-unsubstituted and ortho-unsubstituted. The foregoing phenols can be used in admixture with para-substituted phenols such as para-cresol, para-isopropyl phenol, 3,4-dimethyl phenol, para-chloro phenol, and the like.

The aldehydes useful in the invention are formaldehyde, acetaldehyde, butyraldehyde, crotonaldehyde, chloracetaldehyde, 2 - ethyl hexaldehyde, isobutyraldehyde, and furfural. The aldehydes generally have 1 to 8 carbon atoms per molecule. Ketones, such as acetone, methyl ethyl ketone and methyl octyl ketone, are also useful when it is desired to make polymers containing disubstituted alkylidene radicals linking phenolic moieties in the process of the invention. They generally have 1 to 8 carbon atoms in each alkyl radical.

The catalysts most useful in the process of the invention are the inorganic alkali catalysts such as calcium hydroxide, barium hydroxide, strontium hydroxide, calcium carbonate, barium formate, strontium acetate, magnesium hydroxide, zinc oxide, cadmium hydroxide, beryllium hydroxide, potassium hydroxide, lithium hydroxide, sodium hydroxide, rubidium hydroxide, cesium hydroxide, and the like. Only a small amount of catalyst is generally used in the process of the invention, for example, in the range of 0.02 to 5 percent based on the weight of the phenol. More preferably, the amount of catalyst employed is in the range of 0.02 to 1 percent based on the weight of the phenol, the amount varying to some extent depending upon the strength of the particular alkali employed.

In the process of the invention, the desired alkali catalyst can be mixed with the anhydrous phenol, thereafter raising the mixture to the reaction temperature, i.e., at least 130 degrees centigrade up to the boiling point of the phenol. It is generally more convenient to slurry or dissolve the alkali catalyst in a small amount of water, and to introduce the resulting slurry or solution into the anhydrous phenol, thereafter raising the mixture of catalyst and phenol to the reaction temperature, thereby removing the water added with the alkali. The aldehyde is introduced to the phenol-catalyst mixture at the reaction temperature either portionwise or continuously, to provide a slow rate of addition of aldehyde to phenol. It is preferred to add the aldehyde beneath the surface of the phenol. Under the reaction conditions, the water of the condensation reaction continuously evaporates from the reaction mixture and is normally taken overhead through a distillation zone. If any aldehyde evaporates during the reaction process, it can be recovered and returned directly to the reaction zone. The reaction temperature of at least 130 degrees centigrade up to the boiling point of the phenol is maintained until all the aldehyde has been introduced and substantially no more water escapes from the mixture at the reaction temperature. Thereafter the temperature of the mixture can be elevated, if desired, to remove unreacted phenol. The process can be conducted at atmosphere or at elevated pressure.

The condensation products of the process of the invention usually comprise dinuclear compounds, trinuclear compounds, and higher condensation products including resinous products. The products of the process have a high percentage of o,o'-alkylidene linkages, generally at least 90 percent of the linkages being found to be of the o,o'-configuration, often, and preferably at least 95 percent. The products of the invention can be separated into various fractions prior to use in producing other products, or the composite product can be used as such. Accordingly, the dinuclear compounds, i.e., bisphenols, can be separated and reacted with epichlorohydrin to produce epoxy resins, or can be used in preparing laminating varnishes or binders for particle board. The higher condensation products, or the composite products of the process can be very advantageously used in the production of molding compounds that have faster cure rates than conventional phenol-aldehyde condensation products. Molded articles produced from the condensates of the process of the invention have improved electrical properties. When the condensation products of the invention are used in molding compounds they are generally blended with fillers such as wood flour, cotton flock, cellulose, asbestos, mica, silica, glass fibers, and the like.

The following examples illustrate the process and products of the invention, but are not intended to limit the scope thereof. In these examples, temperatures are given in degrees centigrade and parts by weight unless indicated otherwise.

EXAMPLE 1

500 parts by weight of anhydrous phenol were heated to 80 degrees centigrade, and mixed with a slurry of 0.9 part of calcium hydroxide in 25 parts of water in a reactor provided with a condenser and in communication with the atmosphere. The mixture was elevated to a temperature of 160 degrees centigrade to remove the added water and provide a substantially anhydrous mixture. While maintaining the temperature at 160 degrees centigrade, 81 parts by weight of a 37 weight percent aqueous solution of formaldehyde was introduced portionwise beneath the surface of the phenol over a period of two hours. During the reaction, distillate was taken overhead from the reaction mixture. The distillate contained chiefly water with a few percent of formaldehyde and phenol. The reaction temperature was maintained at about 160 degrees centigrade until substantially all the water had been removed from the reaction mixture, and thereafter the temperature was elevated to about 200 degrees centigrade to remove unreacted phenol. The product of the process was separated by distillation into fractions comprising the dinuclear compound, the trinuclear compound and higher condensation products. The dinuclear fraction was analyzed by determining the melting points of 50–50 mixtures of the dinuclear fraction with each of the pure 2,2'-,2,4'- and 4,4'-dihydroxydiphenyl methanes. The analysis showed that the dinuclear fraction contained 95 percent of 2,2'-dihydroxydiphenyl methane, 3 percent of 2,4'-dihydroxydiphenyl methane and 2 percent of 4,4'-dihydroxydiphenyl methane. The ratio of formaldehyde to phenol used in the reaction corresponded to about 0.2 mole of formaldehyde for one mole of phenol.

EXAMPLE 2

The procedure of Example 1 was repeated, except that the reaction temperature was maintained at 110 degrees centigrade. The resulting dinuclear product contained only 76 percent 2,2'-dihydroxydiphenyl methane, and 17 percent 2,4'-dihydroxydiphenyl methane, and 7 percent 4,4'-dihydroxydiphenyl methane.

EXAMPLE 3

Phenol and formaldehyde were condensed in a process wherein 15,000 parts by weight of anhydrous phenol were first mixed with a slurry of 31 parts of calcium hydroxide in 714 parts of water. The mixture was heated in a reaction zone supplied with a distillation column, and in communication with the atmosphere. The temperature of the mixture was elevated to 165 degrees centigrade and the slow addition of a 37 percent aqueous formaldehyde solution was begun and continued for about 7 hours. The temperature of the reaction mixture was maintained in the range of 136 to 165 degrees centigrade during the introduction of the formaldehyde and until all the formaldehyde had been introduced and substantially no more water escaped from the mixture. During the reaction time, a total of 10,050 parts by weight of formaldehyde solution was introduced to the reactor, an amount sufficient to provide about 0.8 mole of formaldehyde for one mole of phenol. During the reaction period, a total of 9620 parts of distillate was recovered which contained 4.5 percent phenol and 2.9 percent formaldehyde, the remainder being substantially all water. The resinous phenol-aldehyde condensate produced in the reaction had a melting point of 57–68 degrees centigrade.

EXAMPLE 4

The process of the invention was performed using cresol as the phenol reactant. 4730 parts of meta-cresol and 2310 parts of paracresol were mixed with a slurry of 12.6 parts of calcium hydroxide in 100 parts of water in a reactor provided with a condenser and in communication with the atmosphere. The mixture was heated to a temperature of 160 degrees centigrade to remove the water from the catalyst slurry to provide a substantially anhydrous cresol-catalyst mixture. Then, a 37 weight percent aqueous solution of formaldehyde was introduced drop-wise at a uniform rate beneath the surface of the cresol-catalyst mixture. The reaction continued for a period of about 10 hours, during which the reaction temperature was maintained in the range of about 140 to 168 degrees centigrade until all the formaldehyde had been added to the mixture, and substantially no more water escaped from the mixture. A total of 3560 parts of the formaldehyde solution was utilized, an amount sufficient to provide about 0.7 mole of formaldehyde for one mole of cresol. A total of 3167 parts of distillate was recovered from the reaction mixture. This distillate contained about 0.9 weight percent of formaldehyde, about 5 percent of cresol, the remainder being substantially all water. The unreacted cresol fraction contained 58 percent meta-cresol and 42 percent para-cresol. The melting point of the resulting resinous phenolaldehyde condensate (7450 parts by weight) was 45–55 degrees centigrade.

100 parts of the product were mixed with 15 parts of hexamethylenetetramine and lime and was ballmilled for two hours. The resulting mixture cured in 16–21 seconds at 165 degrees centigrade. A similar mixture made with an acid catalyzed cresol-formaldehyde novolac resin cured in 105 seconds at 165 degrees centigrade. 1100 parts of resin-hexamethylenetetramine mixture were compounded with 32 parts of black dye, 1038 parts of wood flour, 42 parts of calcium hydroxide and 50 parts of asbestos. The resulting molding compound was molded at elevated temperature.

Another molding compound was prepared by compounding 1000 parts of the resin-hexamethylenetetramine mixture with 1485 parts of mica, 22.25 parts of lubricant, 15 parts of calcium hydroxide and 25 parts of anhydro formaldehyde aniline. The resulting molding compound was molded at elevated temperature and found to have better dielectric properties than a molding compound made from a conventional novolac resin.

EXAMPLE 5

In another reaction wherein cresol was used as the phenolic reactant, 1265 parts of meta-cresol in substantially anhydrous condition were mixed with 11.2 parts of calcium hydroxide, and the mixture was heated to 160 degrees centigrade in a reactor in communication with the atmosphere. Thereafter, 750 parts of a 37 weight percent aqueous solution of formaldehyde was introduced beneath the surface of the cresol drop-wise at a uniform rate over a period of about three hours. The reaction temperature was maintained at about 160 degrees centigrade at all times during the introduction of the formaldehyde and until all the formaldehyde was introduced and substantially no more water escaped from the mixture. During the reaction, a total of 757 parts of distillate was recovered which contained 1.9 percent of formaldehyde, 1.7 percent of meta-cresol, the remainder being substantially all water. The reactants were employed in a ratio sufficient to provide about 0.8 mole of formaldehyde for one mole of cresol. The resulting resinous phenol-aldehyde condensation product (1315 parts by weight) had a melting point of 80–91 degrees centigrade. This product was utilized to prepare molding compounds following the same procedures as set forth in Example 4. The resulting molding compounds exhibited a faster cure rate and improved electrical properties in the final molded articles over products made from a conventional novolac resin having a low percentage of o,o'-alkylidene linkages.

EXAMPLE 6

Using the procedure of Example 4, 350 parts by weight of 3-methyl-5-ethyl phenol in anhydrous condition were mixed with 3.2 parts by weight of calcium hydroxide catalyst and reacted with 146 parts by weight of a 37 weight percent solution of formaldehyde. The process produced 360 parts by weight of a resinous phenol-aldehyde condensation product having a melting point of 60–70 degrees centigrade.

EXAMPLE 7

Using the procedure of Example 4, 136 parts of meta-isopropyl phenol were mixed with 0.3 part of calcium hydroxide and reacted with 76 parts of a 30 percent aqueous solution of formaldehyde at a temperature of 160 degrees centigrade. 105 parts by weight of a resinous condensation product were produced having a melting point of 50–60 degrees centigrade. The resin was soluble in acetone and was fusible at 165 degrees centigrade. The product was cured with oxalic acid and paraform to produce a thermoset product.

EXAMPLE 8

The process of Example 4 was repeated using 7000 parts by weight of anhydrous phenol and a slurry of 12.6 parts of calcium hydroxide in a small amount of water. 2480 parts by weight of acetaldehyde were employed in the reaction process. A total of 230 parts by weight of acetaldehyde was recovered in the distillate. At the conclusion of the phenol-acetaldehyde reaction, the reaction product was dephenolated to recover 310 parts by weight of unreacted phenol, and 7430 parts by weight of resinous phenol-aldehdye condensate having a melting point of 38–48 degrees centigrade. The resinous product was subjected to fractional precipitation to produce a fraction having a melting point of 111–112 degrees centigrade. Combustion analysis of the fraction showed 78.0 percent carbon, 6.82 percent hydrogen. The calculated values for dihydroxydiphenyl ethane are 78.5 percent carbon and 6.55 percent hydrogen. The fraction was mixed with a sample of authentic 2,2'-dihydroxydiphenyl ethane (melting point 112–113° C.), and the mixture melted at 112–113 degrees centigrade.

EXAMPLE 9

The procedure of Example 4 was used to react 2700 parts by weight of anhydrous phenol with 1560 parts by weight of butyraldehyde in the presence of 4.9 parts by weight of calcium hydroxide catalyst. During the reaction process the distillate was collected and separated into water and organic fractions, and the organic layer was recirculated to the reactor. At the conclusion of the reaction process, the product was dephenolated. A total of 1660 parts by weight of phenol and 1530 parts by weight of butyraldehyde were consumed in the reaction. 2228 parts by weight of resinous product were obtained, having a melting point of 58–66 degrees centigrade.

EXAMPLE 10

The process of Example 4 was repeated to react 2500 parts by weight of anhydrous phenol with 1425 parts by weight of crotonaldehyde in the presence of 6.5 parts by weight of calcium hydroxide. As in Example 9, the overhead distillate was separated into water and organic layers, and the organic portion was recirculated to the reactor. The reaction product was distilled to remove unreacted phenol. 1960 parts of resinous product were obtained having a melting point of 45–54 degrees centigrade.

While this invention has been described with reference to certain specific embodiments, it will be recognized by those skilled in the art that many variations are possible without departing from the spirit and scope of the invention.

We claim:

1. In making a phenol-aldehyde condensate in which the para position of the phenolic portion of the condensate is predominantly in unreacted condition, the process which comprises heating a mixture of a para-unsubstituted phenol in substantially anhydrous condition with an inorganic alkali catalyst to a temperature of at least 130 degrees centigrade and below the boiling point of the phenol, then introducing an aldehyde of 2 to 8 carbon atoms slowly into the preheated mixture in total proportion of 0.1 to 1 mole of the aldehyde for one mole of the phenol, and maintaining the resulting mixture at a temperature within the range stated until all the aldehyde has been introduced.

2. A process for producing a phenol-aldehyde condensate in which the phenol and aldehyde residues are joined to provide at least 90 percent of o,o'-alkylidene linkages, which comprises heating a mixture of a phenol in substantially anhydrous condition with an inorganic alkali catalyst to a temperature of at least 130 degrees centigrade and below the boiling point of the phenol, and then introducing an aldehyde of 2 to 8 carbon atoms slowly into the preheated mixture in total proportion of 0.1 to 1 mole of the aldehyde for one mole of the phenol, and maintaining the resulting mixture at a temperature within the range stated until all the aldehyde has been introduced.

3. The process of claim 1 wherein the inorganic alkali catalyst is calcium hydroxide.

4. The process of claim 1 wherein a proportion of 0.5 to 0.9 mole of the aldehyde for one mole of the phenol is employed.

5. The process of claim 4 wherein the phenol has the formula $C_6H_5OH$.

6. The process of claim 5 wherein the aldehyde is acetaldehyde.

7. The process of claim 5 wherein the aldeyhde is butyraldehyde.

8. The process of claim 5 wherein the aldehyde is crotonaldehyde.

References Cited

UNITED STATES PATENTS

| | | | |
|---|---|---|---|
| 1,102,630 | 7/1914 | Aylsworth | 260—59 |
| 1,126,926 | 2/1915 | Wiechmann | 260—57 |
| 2,715,114 | 8/1955 | Huck | 260—57 |
| 3,106,547 | 10/1963 | McTaggart et al. | 260—57 |
| 3,108,978 | 10/1963 | McNaughton et al. | 260—19 |

WILLIAM H. SHORT, *Primary Examiner.*

H. SCHAIN, *Assistant Examiner.*

U.S. Cl. X.R.

260—17.2, 20, 38, 47, 53, 54, 56, 57, 58, 838; 161—262